March 18, 1930. J. J. VAN VALKENBURG 1,751,458
SAFETY SHACKLE SNAP
Filed July 12, 1929
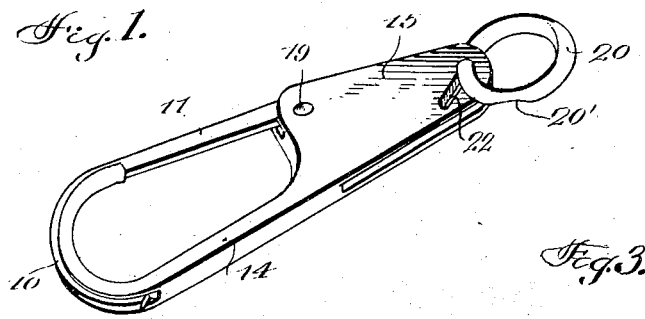
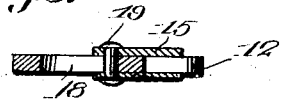
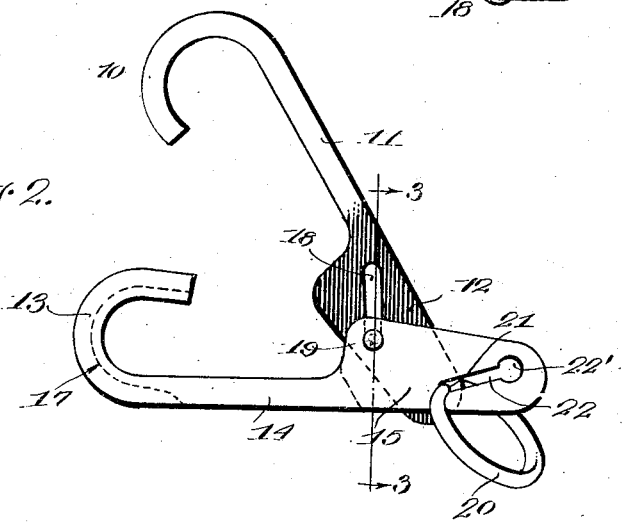
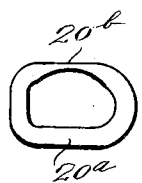
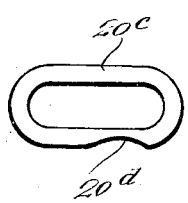
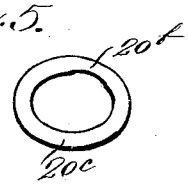
WITNESSES
INVENTOR
John J. Van Valkenburg
BY
ATTORNEY Patented Mar. 18, 1930

1,751,458

UNITED STATES PATENT OFFICE

JOHN J. VAN VALKENBURG, OF LOWE INLET, BRITISH COLUMBIA, CANADA

SAFETY SHACKLE SNAP

Application filed July 12, 1929. Serial No. 377,829.

This invention appertains to improvements in safety shackle snaps generally, and has for its main object to provide a type of the same which embodies a positive locking means capable of effectively retaining the pivoted jaws and guard thereof in a closed position in use; the latter means, at the same time, acting as a medium for the attaching of the snap to a line or rope, such as is employed for various purposes on boats, especially sail boats and the like.

Another object of the invention is to provide a snap hook of the class set forth, which when engaged about a shackle or the like, will automatically close and lock in instances of a strain being brought to bear upon the combined locking and attaching member forming a part of the same as aforesaid and which is capable of being readily and easily unlocked, opened, closed and relocked by the manual operation of the parts in the absence of such strain.

With the foregoing and other equally important objects and advantages in view, the invention resides in the certain new and useful combination, construction and arrangement of parts as will be hereinafter more fully described, set forth in the appended claims, and illustrated in the accompanying drawings, in which:

Figure 1 is a perspective view of the improved snap hook as it appears when closed and locked;

Figure 2 is a side elevation of the same when unlocked and open;

Figure 3 is a section taken on the line 3—3 of Figure 2;

Figure 4 is a side elevation of one form of the combined attaching and locking means therefor;

Figure 5 is a similar view of another form of the said means; and

Figure 6 is another similar view of a further modification of the means.

Referring to the drawings, the embodiment of the invention, as shown therein by way of example, is generally constituted in a hook member 10 having a substantially straight shank 11 which terminates at its end opposite to the hook 10, in an inwardly flattened portion 12. A guard 13 for the hook 10 is also provided with a substantially straight shank 14 and a flat casing portion 15 at its end opposite to the hook guard 13.

As shown, these flattened portions 12 and 15 are of a substantially equal area and have their side edges disposed flush with one another when the hook 10 is engaged in the channel 17 in the outer curved side of the guard 13 (Figure 2). The parts, as thus constructed and arranged, are connected together by a slot 18 formed in the flattened portion 12 engaged by a pivot pin 19 carried by the flattened portion 15, the slot being extended diagonally across the portion 12 toward its free end from a point adjacent the connected end of the shank 11, and the pin 19 secured in the portion 16 adjacent its inner corner opposite to the point of connection of the shank 14. By this arrangement when the parts are moved to open or closed position, the same have the necessary combined lateral and endwise movements, one relative to the other, to cause the hook 10 to seat in or disengage from the channel 17 in the outer side of the guard 13.

For the purpose of attaching the snap hook to a line or the like (not shown), a closed loop or link 20 is provided, and the same is engaged through an opening 21, formed in the flattened portion 12, and a slot 22, complemental to the opening 21 and formed in the flattened portion 15. The opening 21 is arranged to one side of the longitudinal center of the outer end portion of the flattened portion 12, as is the outer enlarged end 22', of the slot 22, in the flattened portion 15, so that, when the hook and guard parts 10 and 13 are engaged, the opening 21 and the enlarged slot end 22' will register one with the other. The slot 22 is arranged to extend diagonally inwardly of the flat portion 15 from a point adjacent the outer end thereof, or in a reverse direction with respect to the slot 18 in the flat portion 12, substantially as is shown in Figure 2. The flattened portion 15, of the guard 13, is preferably in the form of a hollow casing, which is open at its opposite ends and inner side edge, so as to receive the flattened portion 12 of the hook 10, between the parallel side walls thereof. The front side edge of the casing is also open for a distance inwardly of the free end of the casing, so as to give clearance to the free end of the flattened portion 12 of the hook 10 when the parts are moved to open position. When so formed, the opposite parallel side walls of the casing will each be provided with a slot 22, one arranged in registry with the other.

The loop or link 20, as shown in Figures 1 and 2, is preferably in the form of a ring, and is flattened, as at 20' (Figure 1) at one point on the same and in a manner to enter the slot 22 from the enlarged end 22' when the hook and guard parts of the snap are to be unlocked and opened but otherwise acts to lock the parts in closed position when this flattened or reduced portion 20' is out of registry with the slot 22. Thus, with the parts disposed in open position, as shown in Figure 2, it will be readily apparent that, after the guard 13 has been engaged with the shackle (not shown), as for instance a boat mooring ring or the like, any strain brought to bear on the attaching ring or member 20 will result in the movement of the latter outward of the slot 22 and a consequent automatic closing movement of the jaw 10 on the guard 13. Further strain on the ring or member 20 thereafter in most cases will result in an automatic turning of the same and the moving of the reduced portion 20' thereof out of registry with the outer end of the narrower portion of the slot 22.

In Figure 3, a D-form of locking and attaching link 20ª is illustrated, and the same may be substituted for the ring form 20 before-mentioned. One side of the link 20ª will be reduced or flattened, as at 20ᵇ, for registry with the slot 22 for the stated purposes of the reduced or flattened portion 20' of the ring 20.

An oval form of locking and attaching link 20ª, having a reduced or flattened portion 20ᵇ is shown in Figure 4; and an elongated narrow form of link 20ᵉ having a reduced or flat portion 20ᶠ, is shown in Figure 5, both of which loops or links may be readily substituted for either of the links 20 or 20ª, or one for the other.

Without further description, it is thought that the features and advantages of the invention will be readily apparent to those skilled in the art, and it will of course be understood that changes in the form, proportion and minor details of construction may be resorted to, without departing from the spirit of the invention or its scope as claimed.

I claim:

1. A snap hook comprising an elongated shank having a hook portion at one end and a flattened portion at its opposite end, a second shank having a guard portion at one end for cooperation with said hook portion, a casing at the opposite end of said second shank and adapted to house said flattened portion when the hook and guard portions are engaged, a pin and slot connection between the inner end portions of the said flattened portion and said casing, and movable means in one position of its use being cooperative with the outer end portions of said flattened portion and said casing for locking said hook and guard portions in engaged positions and turnable to another position of use to allow the hook and guard portions to be released.

2. A snap hook comprising an elongated shank having a hook portion at one end and a flattened portion at its opposite end, a second shank having a guard portion at one end for cooperation with said hook portion, a casing at the opposite end of said second portion and adapted to house said flattened portion when the hook and guard portions are engaged, a pin and slot connection between the inner end portions of the said flattened portion and said casing and a looped attaching member carried in registering openings formed in the outer end of the said flattened portion and said casing to normally lock said hook and guard portions in closed position, said looped member having a reduced portion adapted to be moved into slot-ways formed in the opposite side walls of said casing to allow said hook and guard portions to be moved to open position.

JOHN J. VAN VALKENBURG.